(12) United States Patent
Kubota

(10) Patent No.: US 11,323,672 B2
(45) Date of Patent: May 3, 2022

(54) CONTROL METHOD FOR PROJECTOR AND PROJECTOR

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/105,889

(22) Filed: Nov. 27, 2020

(65) Prior Publication Data

US 2021/0168341 A1 Jun. 3, 2021

(30) Foreign Application Priority Data

Nov. 28, 2019 (JP) .............................. JP2019-214922

(51) Int. Cl.
*H04N 9/31* (2006.01)
*H04N 5/225* (2006.01)

(52) U.S. Cl.
CPC ......... *H04N 9/3179* (2013.01); *H04N 5/2253* (2013.01); *H04N 9/3141* (2013.01)

(58) Field of Classification Search
CPC .................................................... H04N 9/3179
See application file for complete search history.

(56) References Cited

U.S. PATENT DOCUMENTS

2006/0114431 A1  6/2006 Ushiro
2010/0245586 A1* 9/2010 Terauchi .............. H04N 9/3161
                                                                 348/164

FOREIGN PATENT DOCUMENTS

| JP | 2004-163816 A | 6/2004 |
| JP | 2004-347871 A | 12/2004 |
| JP | 2006-154260 A | 6/2006 |
| JP | 2006-201494 A | 8/2006 |
| JP | 2009-223490 A | 10/2009 |
| JP | 2016-92779 A | 5/2016 |

* cited by examiner

*Primary Examiner* — Samira Monshi
(74) *Attorney, Agent, or Firm* — Oliff PLC

(57) ABSTRACT

A projector includes a first control section and a projector main body to which a camera is detachably mountable. The first control section is configured to be capable of communicating with the camera when the camera is detached from the projector main body. When the camera is mounted on the projector main body, the first control section executes first processing. When the camera is detached from the projector main body, the first control section enables communication connection to the camera and executes second processing different from the first processing.

8 Claims, 9 Drawing Sheets

CONTROL METHOD FOR PROJECTOR AND PROJECTOR

The present application is based on, and claims priority from JP Application Serial Number 2019-214922, filed Nov. 28, 2019, the disclosure of which is hereby incorporated by reference herein in its entirety.

BACKGROUND

1. Technical Field

The present disclosure relates to a control method for a projector and the projector.

2. Related Art

There has been known various techniques for adjusting a projected image of a projector based on a captured image of a camera.

For example, JP-A-2004-347871 (Patent Literature 1) discloses a projector including a main body section of the projector on which a digital camera is detachably mounted, a projection lens that is attached to a main body of the projector and irradiates data for display, and a control section that projects a chart for auto white balance adjustment from the projection lens when the digital camera is mounted and performs, based on color signals from the digital camera that captures and takes in an image of the projected chart for auto white balance adjustment, white balance adjustment for the data for display projected from the projection lens.

In the projector described in Patent Literature 1, it is possible to easily perform adjustment of a projected image such as the white balance adjustment.

However, in the projector described in Patent Literature 1, when the camera is not attached to the main body section of the projector, it is likely to be difficult to execute the adjustment of the projected image.

SUMMARY

An aspect of the present disclosure is directed to a control method for a projector on which an imaging device is detachably mountable, the control method including: executing first processing when the imaging device is mounted on the projector; and enabling communication connection to the imaging device and executing second processing different from the first processing when the imaging device is detached from the projector.

In the control method for a projector, when the imaging device is mounted on the projector, as the first processing, operation of the imaging device maybe controlled.

In the control method for a projector, the projector may include a first connector and a second connector different from the first connector, when the imaging device is mounted on the projector, the first connector coupled to the imaging device is enabled, and, when the imaging device is detached from the projector, the second connector coupled to the imaging device via a cable may be enabled.

In the control method for a projector, when the imaging device is detached from the projector, the second processing may be executed based on operation on the imaging device.

In the control method for a projector, when the imaging device is detached from the projector, as the second processing, image light showing a predetermined pattern image may be projected in a first direction based on the operation on the imaging device.

In the control method for a projector, when a projection optical device having a U-shaped optical path is mounted, the imaging device maybe detached from the projector and the image light may be projected in a second direction different from the first direction via the projection optical device, and, when the projection optical device is detached, the imaging device may be mounted on the projector.

Another aspect of the present disclosure is directed to a projector including: a projector main body on which an imaging device is detachably mountable; an interface circuit configured to be capable of communicating with the imaging device when the imaging device is detached from the projector main body; and a processor configured to execute first processing when the imaging device is mounted on the projector main body and execute second processing different from the first processing when the imaging device is detached from the projector main body.

DESCRIPTION OF EXEMPLARY EMBODIMENTS

An embodiment of the present disclosure is explained below with reference to the drawings.

1. Configuration of a Display System

1-1. Configuration of the Display System in a First State

Figure 1:
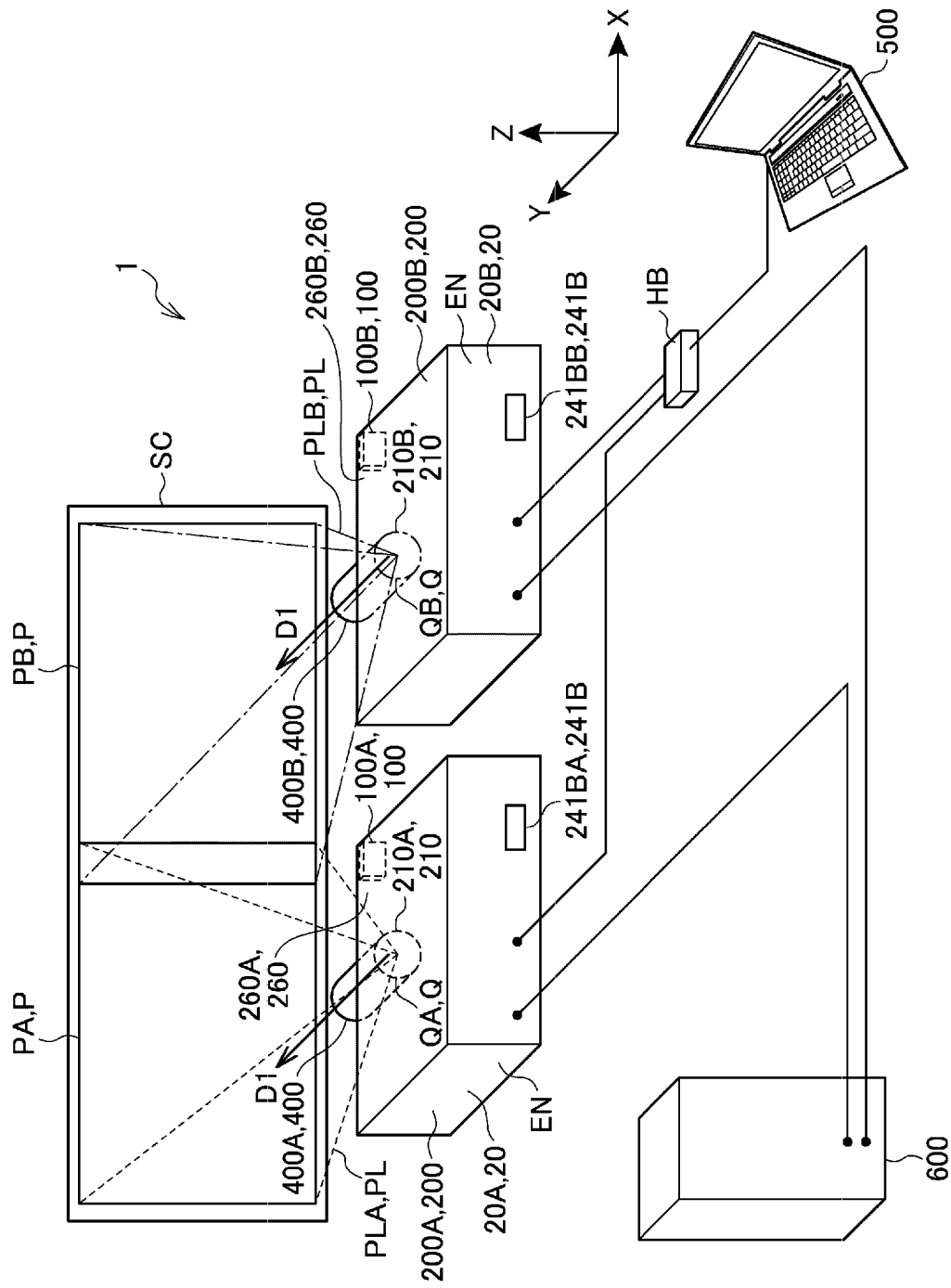
FIG. 1 is a diagram showing an example of the configuration of a display system in a first state according to an embodiment.

FIG. 1 is a diagram showing an example of the configuration of a display system 1 in a first state according to an embodiment.

In FIG. 1, an X axis, a Y axis, and a Z axis orthogonal to one another are shown. The Z axis indicates the vertical direction. The X axis and the Y axis are parallel to the horizontal direction. The X axis indicates the left-right direction and the Y axis indicates the front-rear direction.

A display system 1 includes an image supply device 600, a projector 200A, a projector 200B, a camera 100A, a camera 100B, and a control device 500.

The image supply device 600 is communicably coupled to each of the projector 200A and the projector 200B and transmits image data to each of the projector 200A and the projector 200B. The image supply device 600 is configured by, for example, a personal computer or a DVD (Digital Versatile Disc) player.

The image supply device 600 is USB-coupled to each of the projector 200A and the projector 200B by, for example, a USB (Universal Serial Bus) cable.

In this embodiment, the image supply device 600 is USB-coupled to each of the projector 200A and the projector 200B. However, embodiments of the present disclosure are not limited to this. An interface for coupling the image supply device 600 and each of the projector 200A and the projector 200B may be an analog interface such as a VGA (Video Graphics Array), a D terminal, or an S terminal. The interface for coupling the image supply device 600 and each of the projector 200A and the projector 200B may be a digital interface such as a DVI (Digital Visual Interface), an HDMI (registered trademark: High-Definition Multimedia Interface), a Display Port, or an HDBaseT (registered trademark). An interface for coupling to a projector 200 may be a communication interface such as an Ethernet (registered trademark) or IEEE1394.

The image supply device 600 may transmit image data to each of the projector 200A and the projector 200B via wireless communication such as Wi-Fi (registered trademark).

In the display system 1 in a first state, the projector 200A includes a projector main body 20A and a projection optical device 400A and the projector 200B includes a projector main body 20B and a projection optical device 400B. The projection optical device 400A is mounted on a mounting section 210A of the projector main body 20A. The projection optical device 400B is mounted on a mounting section 210B of the projector main body 20B.

The projection optical device 400A projects image light PLA in a first direction D1 based on the projector main body 20A. In other words, the projector 200A projects image light PLA onto a screen SC via the projection optical device 400A, which is a so-called "straight projection optical device". The projection optical device 400B projects image light PLB in the first direction D1 based on the projector main body 20B. In other words, the projector 200B projects the image light PLB onto the screen SC via the projection optical device 400B, which is a so-called "straight projection optical device". In FIG. 1, the first direction D1 indicates a positive direction of the Y axis.

The projector 200A is disposed such that the mounting section 210A faces the positive direction of the Y axis. A projection port of the projection optical device 400A mounted on the mounting section 210A faces the positive direction of the Y axis. The projector 200B is disposed such that the mounting section 210B faces the positive direction of the Y axis. A projection port of the projection optical device 400B mounted on the mounting section 210B faces the positive direction of the Y axis. The positive direction of the Y axis indicates a direction from each of the projector 200A and the projector 200B toward the screen SC.

In the mounting section 210A, an opening QA is formed to be capable of projecting the image light PLA generated on the inside of the projector main body 20A to the outside. In the projector 200A, a surface including the opening QA is opposed to the screen SC. In the mounting section 210B, an opening QB is formed to be capable of projecting the image light PLB generated on the inside of the projector main body 20B to the outside. In the projector 200B, a surface including the opening QB is opposed to the screen SC.

Since the opening QA and the opening QB have substantially the same configuration, in the following explanation, the opening QA and the opening QB are sometimes described as opening Q. The opening Q is explained below with reference to FIG. 5.

The projection optical device 400A and the projection optical device 400B have substantially the same configuration. In the following explanation, when the projection optical device 400A and the projection optical device 400B are not distinguished, the projection optical device 400A and the projection optical device 400B are sometimes described as projection optical device 400.

The projection optical device 400 corresponds to an example of a "projection optical device".

The screen SC is disposed on the positive direction side of the Y axis with respect to each of the projector 200A and the projector 200B.

The projector 200A receives image data from the image supply device 600. The projection optical device 400A projects the image light PLA corresponding to the received image data and displays a projected image PA on the screen Sc. The projector 200B receives image data from the image supply device 600. The projection optical device 400B projects the image light PLB corresponding to the received image data and displays a projected image PB on the screen SC.

In the following explanation in the embodiment of the present disclosure, the projected image PA and the projected image PB are displayed side by side, so-called tiling display is performed. In the following explanation, the projected image PA and the projected image PB are collectively referred to as projected image P.

The camera 100A is attached to the projector 200A. The camera 100B is attached to the projector 200B.

The projector 200A includes a camera attachment section 260A in the projector main body 20A. The projector 200B includes a camera attachment section 260B in the projector main body 20B. In the display system 1 in the first state, the camera 100A is attached to the camera attachment section 260A and the camera 100B is attached to the camera attachment section 260B. The camera 100A is coupled to the projector main body 20A without using a cable and is capable of communicating with the projector 200A. The camera 100B is coupled to the projector main body 20B without using a cable and is capable of communicating with the projector 200B.

The camera attachment section 260A and the camera attachment section 260B have substantially the same configuration. In the following explanation, when the camera attachment section 260A and the camera attachment section 260B are not distinguished, the camera attachment section 260A and the camera attachment section 260B are sometimes described as camera attachment section 260. The camera attachment section 260 is explained in detail below with reference to FIG. 4. The camera attachment section 260 is disposed such that a camera 100 attached to the camera attachment section 260 is capable of photographing the projected image P from the projection optical device 400.

In the display system 1 in the first state, the camera 100A and the camera 100B are respectively controlled by the projector 200A and the projector 200B like a built-in camera of a projector.

The projector 200A and the projector 200B have substantially the same configuration. In the following explanation, when the projector 200A and the projector 200B are not distinguished, the projector 200A and the projector 200B are sometimes described as projector 200.

In FIG. 1, an example of floor installation in which each of the projector 200A and the projector 200B is placed on a floor in front of the screen SC. Each of the projector 200A and the projector 200B may be hung from a ceiling and set. In the embodiment of the present disclosure, an example is explained in which each of the projector 200A and the projector 200B projects image light onto the screen SC, which is a plane. However, a projection target is not limited to the screen SC and may be a plane such as a wall surface of a building or may be a curved surface or an uneven surface.

The camera 100A images an imaging range including the projected image PA and forms a captured image. Data indicating the captured image is used when the projector 200A adjusts the projected image PA. The adjustment of the projected image PA by the projector 200A includes adjustment of a size and a shape of the projected image PA, adjustment of a tinge and brightness of the projected image PA, and adjustment of the tiling display. The camera 100 may generate data for these adjustments.

The camera 100B images an imaging range including the projected image PB and forms a captured image. Data indicating the captured image is used when the projector 200B adjusts the projected image PB. The adjustment of the projected image PB by the projector 200B includes adjustment of a size and a shape of the projected image PB, adjustment of a tinge and brightness of the projected image PB, and adjustment of the tiling display. The camera 100 may generate data for these adjustments.

The camera 100A and the camera 100B have substantially the same configuration. In the following explanation, when the camera 100A and the camera 100B are not distinguished, the camera 100A and the camera 100B are sometimes described as camera 100.

In the following explanation, when the projected image PA and the projected image PB are not distinguished, the projected image PA and the projected image PB are sometimes described as projected image P.

The camera 100 corresponds to an example of an "imaging device".

The configuration of the camera 100 is explained in detail below with reference to FIGS. 5 and 6.

The control device 500 is communicably coupled to the projector 200A and the projector 200B. Specifically, the control device 500 is communicably coupled to the projector 200A and the projector 200B via a network hub HB according to the Ethernet (registered trademark) standard.

The control device 500 is configured by, for example, a personal computer and outputs instruction information to each of the projector 200A and the projector 200B. Each of the projector 200A and the projector 200B operates according to the instruction information output from the control device 500.

1-2. Configuration of a Display System in a Second State

Figure 2:
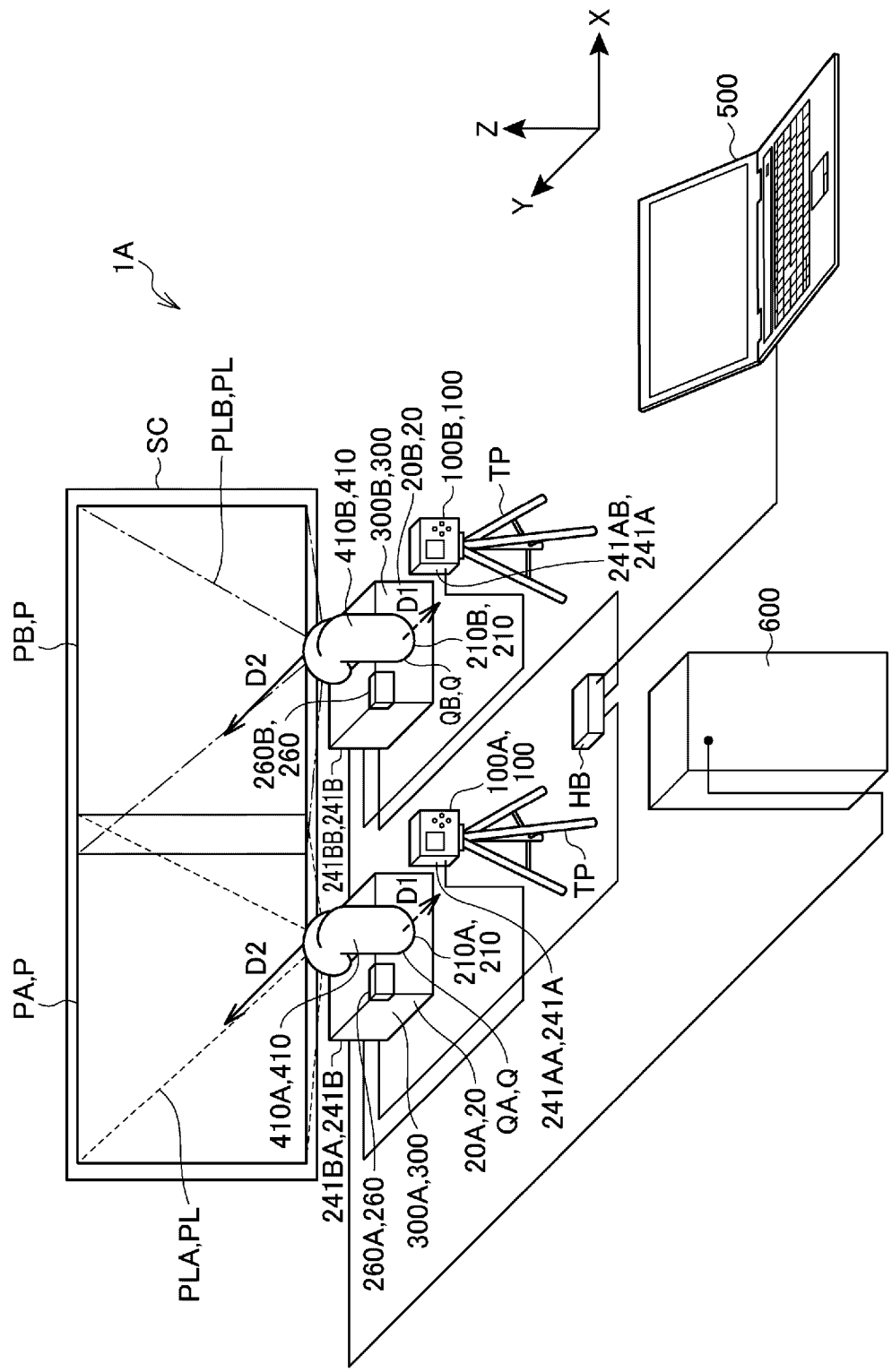
FIG. 2 is a diagram showing an example of the configuration of a display system in a second state according to the embodiment.

FIG. 2 is a diagram showing an example of the configuration of a display system 1A in a second state according to this embodiment.

The display system 1A in the second state includes a projector 300A and a projector 300B. The projector 300A includes the projector main body 20A and a projection optical device 410A. The projector 300B includes the projector main body 20B and a projection optical device 410B. The projection optical device 410A is mounted on the mounting section 210A of the projector main body 20A. The projection optical device 410B is mounted on the mounting section 210B of the projector main body 20B. The camera 100 is detached from the projector 200. In the following explanation, about the display system 1A, changes from the display system 1 are mainly explained. The projector 300A and the projector 300B have substantially the same configuration. In the following explanation, when the projector 300A and the projector 300B are not distinguished, the projector 300A and the projector 300B are sometimes described as projector 300.

The projector 300A is disposed such that the mounting section 210A faces a negative direction of the Y axis. A projection port of the projection optical device 410A mounted on the mounting section 210A faces the positive direction of the Y axis. The projector 300B is disposed such that the mounting section 210B faces the negative direction of the Y axis. A projection port of the projection optical device 410B mounted on the mounting section 210B faces the positive direction of the Y axis.

The negative direction of the Y axis indicates a direction from the screen SC toward each of the projector 300A and the projector 300B. In the projector 300A, a surface including the opening QA is not opposed to the screen SC. In the projector 300B, a surface including the opening QB is not opposed to the screen SC.

The projection optical device 410A projects the image light PLA in a second direction D2 based on the projector main body 20A. In other words, the projector 300A projects the image light PLA onto the screen SC via the projection optical device 410A, which is a so-called "bent-type projection optical device". The projection optical device 410B projects the image light PLB in the second direction D2 based on the projector main body 20B. In other words, the projector 300B projects the image light PLB onto the screen SC via the projection optical device 410B, which is a so-called "bent-type projection optical device". In FIG. 2, the second direction D2 indicates the positive direction of the Y axis.

The projection optical device 410A and the projection optical device 410B have substantially the same configuration. In the following explanation, when the projection optical device 410A and the projection optical device 410B are not distinguished, the projection optical device 410A and the projection optical device 410B are sometimes described as projection optical device 410.

The screen SC is disposed on the positive direction side of the Y axis with respect to each of the projector 300A and the projector 300B.

The second direction D2 indicates the opposite direction of the first direction D1 based on the projector 300A. The second direction D2 indicates the opposite direction of the first direction D1 based on the projector 300B. In FIG. 2, the first direction D1 indicates the negative direction of the Y axis. In FIG. 2, the second direction D2 indicates the positive direction of the Y axis.

The projection optical device 410A and the projection optical device 410B have substantially the same configuration. In the following explanation, when the projection optical device 410A and the projection optical device 410B are not distinguished, the projection optical device 410A and the projection optical device 410B are sometimes described as projection optical device 410.

In the display system 1A in the second state, the camera 100A is detached from the camera attachment section 260A and disposed to be able to capture at least the projected image PA. In the display system 1A in the second state, the camera 100B is detached from the camera attachment section 260B and disposed to be able to capture at least the projected image PB.

The camera 100A is communicably coupled to the projector 300A. The camera 100B is communicably coupled to the projector 300B. For example, a first connector 241AA of the camera 100A is communicably coupled to a second connector 241BA of the projector 300A via a USB cable according to the USB standard. A first connector 241AB of the camera 100B is communicably coupled to a second connector 241BB of the projector 300B via a USB cable according to the USB standard.

In the following explanation, the first connector 241AA and the first connector 241AB are sometimes described as first connector 241A. The second connector 241BA and the second connector 241BB are sometimes described as second connector 241B.

The camera 100A is disposed on the negative direction side of the Y axis with respect to the projector 300A. The camera 100B is disposed on the negative direction side of the Y axis with respect to the projector 300B. Each of the camera 100A and the camera 100B is supported by a tripod TP.

2. Configuration of the Projector

Figure 3:
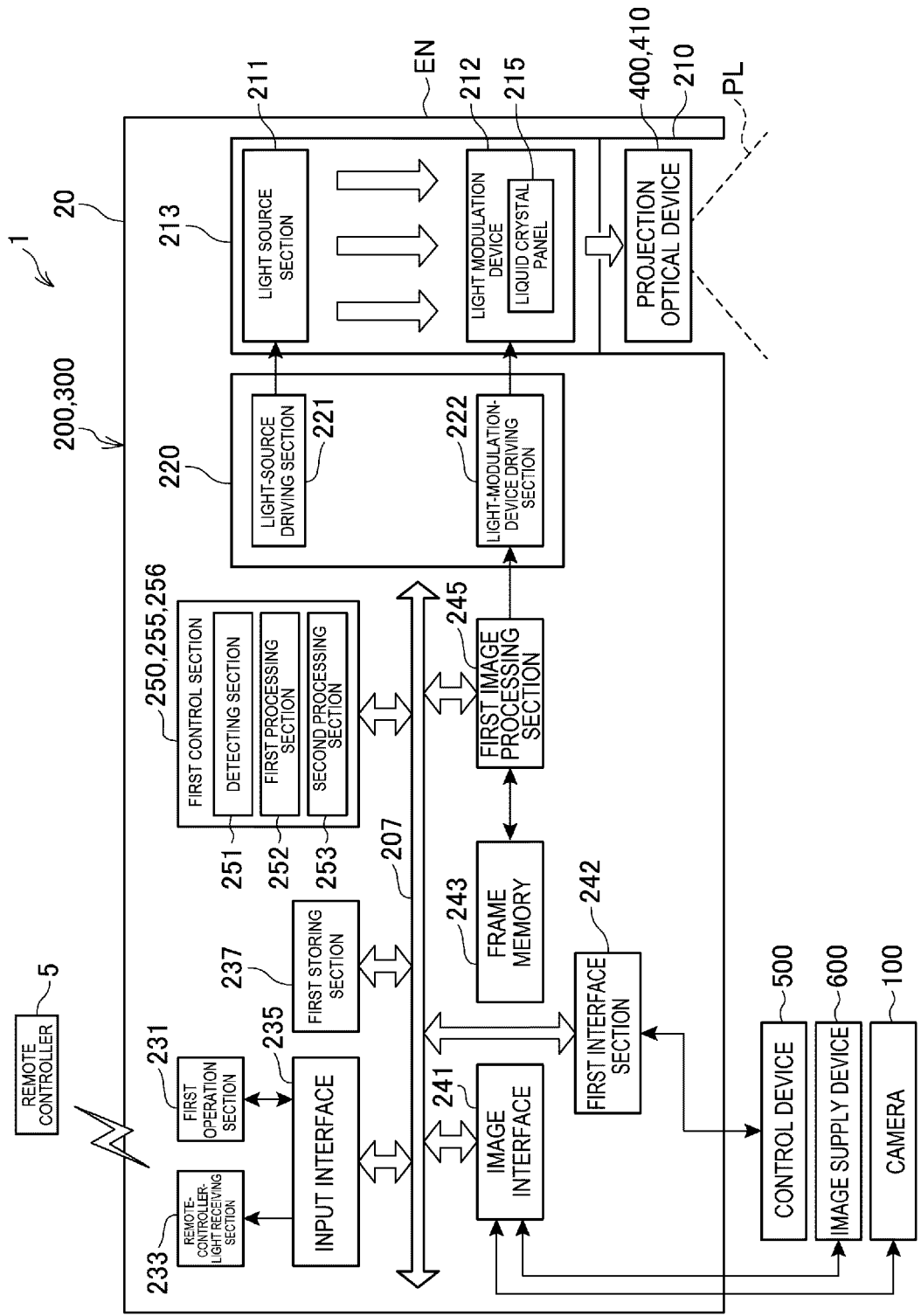
FIG. 3 is a diagram showing an example of the configuration of a projector according to the embodiment.

FIG. 3 is a diagram showing an example of the configuration of the projector 200 and the projector 300 according to this embodiment.

The projector 200 and the projector 300 include a projector main body 20 and a remote controller 5. The projection optical device 400 and the projection optical device 410 are detachably mountable on the projector main body 20. In the projector 200, the projection optical device 400 is mounted on the projector main body 20. In the projector 300, the projection optical device 410 is mounted on the projector main body 20.

The camera 100 is detachably attachable to the projector main body 20. In the projector 200, the camera 100 is communicably attached to the camera attachment section 260 of the projector main body 20. In the projector 300, the camera 100 is detached from the projector main body 20 and communicably coupled by a cable.

The projector main body 20 includes an enclosure EN, a first control section 250 housed in the enclosure EN, a mounting section 210 of the projection optical device 400 and the projection optical device 410, an optical unit 213, and a driving section 220 that drives the optical unit 213. The optical unit 213 performs formation of an optical image and generates image light PL.

The projection optical device 400 and the projection optical device 410 are detachably mountable on the mounting section 210. Specifically, in the display system 1 in the first state shown in FIG. 1, the projection optical device 400 is mounted on the mounting section 210. In the display system 1A in the second state shown in FIG. 2, the projection optical device 400 is detached from the mounting section 210 and the projection optical device 410 is mounted on the mounting section 210.

The optical unit 213 includes a light source section 211 and a light modulation device 212. The driving section 220 includes a light-source driving section 221 and a light-modulation-device driving section 222.

The light source section 211 includes a lamp such as a halogen lamp, a xenon lamp, or an ultra-high pressure mercury lamp or a solid-state light source such as an LED (Light Emitting Diode) or a laser light source.

The light source section 211 may include a reflector and an auxiliary reflector that guide light emitted by a light source to the light modulation device 212. Further, the light source section 211 may include a lens group and a polarizing plate for improving an optical characteristic of projected light or a dimming element for reducing a light amount of the light emitted by the light source on a path leading to the light modulation device 212.

The light-source driving section 221 is coupled to a first internal bus 207 and lights and extinguishes a light source of the light source section 211 according to an instruction of the first control section 250 coupled to the first internal bus 207 as well.

The light modulation device 212 includes, for example, three liquid crystal panels 215 corresponding to the three primary colors of R, G, and B. R indicates red, G indicates green, and B indicates blue. That is, the light modulation device 212 includes the liquid crystal panel 215 corresponding to R color light, the liquid crystal panel 215 corresponding to G color light, and the liquid crystal panel 215 corresponding to B color light.

Light emitted by the light source section 211 is separated into color lights of the three colors of R, G, and B. The color lights are respectively made incident on the liquid crystal panels 215 corresponding thereto. Each of the three liquid crystal panels 215 is a transmissive liquid crystal panel and modulates light transmitted therethrough and generates the image light PL. The image lights PL transmitted through the liquid crystal panels 215 and modulated are combined by a combination optical system such as a cross dichroic prism and emitted.

In the following explanation in this embodiment, the light modulation device 212 includes the transmissive liquid crystal panels 215 as light modulation elements. However, embodiments of the present disclosure are not limited to this. The light modulation elements maybe reflective liquid crystal panels or may be digital micromirror devices.

The light modulation device 212 is driven by the light-modulation-device driving section 222. The light-modulation-device driving section 222 is coupled to a first image processing section 245.

Image data corresponding to the primary colors of R, G, and B is input to the light-modulation-device driving section 222 from the first image processing section 245. The light-modulation-device driving section 222 converts the input image data into data signals suitable for the operation of the liquid crystal panels 215. The light-modulation-device driving section 222 applies voltages to pixels of the liquid crystal panels 215 based on the converted data signals and draws images on the liquid crystal panels 215.

Each of the projection optical device 400 and the projection optical device 410 includes a lens, a mirror, and the like for focusing the incident image light PL on the screen SC. Each of the projection optical device 400 and the projection optical device 410 may include a zoom mechanism for enlarging or reducing an image projected onto the screen SC and a focus adjusting mechanism for performing adjustment of a focus.

The projection optical device 400 projects the image light PL along an incident direction. The projection optical device 410 bends and projects the image light PL for the purpose of short focusing and the like.

The projector main body 20 includes a first operation section 231, a remote-controller-light receiving section 233, an input interface 235, a first storing section 237, an image interface 241, a frame memory 243, the first image processing section 245, and the first control section 250. The input interface 235, the first storing section 237, the image interface 241, the first image processing section 245, and the first control section 250 are coupled to be capable of performing data communication one another via the first internal bus 207.

The first operation section 231 includes various buttons and switches provided on an enclosure surface of the projector 200. The first operation section 231 generates an operation signal corresponding to operation on the buttons and the switches and outputs the operation signal to the input interface 235. The input interface 235 is a circuit that outputs the operation signal input from the first operation section 231 to the first control section 250.

The remote-controller-light receiving section 233 receives an infrared signal transmitted from the remote controller 5, decodes the received infrared signal, and generates an operation signal. The remote-controller-light receiving section 233 outputs the generated operation signal to the input interface 235. The input interface 235 is a circuit that outputs the operation signal input from the remote-controller-light receiving section 233 to the first control section 250.

The first storing section 237 is a nonvolatile storage device such as a hard disk drive or an SSD (Solid State Drive). The first storing section 237 stores programs to be executed by the first control section 250 and data, processed by the first control section 250, image data, and the like.

The image interface 241 includes a connector and an interface circuit and is configured to be capable of coupling by wire to the image supply device 600 that supplies image data to the projector 200 and the projector 300.

In this embodiment, the image interface 241 is, for example, an interface circuit for exchanging image data and the like with the image supply device 600 according to the USB standard. The image interface 241 is, for example, an interface circuit for exchanging image data and the like with the camera 100 according to the USB standard.

The image interface 241 and the first connector 241A correspond to an example of an "interface".

A first interface section 242 is a communication interface that executes communication with the control device 500 according to the Ethernet (registered trademark) standard. The first interface section 242 includes a connector to which an Ethernet (registered trademark) cable is coupled and an interface circuit that processes a signal transmitted through the connector.

The first interface section 242 is an interface substrate including a connector and an interface circuit and is coupled to a main substrate on which a first processor 255 and the like of the first control section 250 are mounted. Alternatively, the connector and the interface circuit configuring the first interface section 242 are mounted on the main substrate of the first control section 250. The first interface section 242 receives, for example, various kinds of setting information and various kinds of instruction information from the control device 500.

The first control section 250 includes a first memory 256 and the first processor 255.

The first memory 256 is a storage device that stores, in a nonvolatile manner, programs to be executed by the processor 255 and data. The first memory 256 is configured by a magnetic storage device, a semiconductor storage element such as a flash ROM (Read Only Memory), or a nonvolatile storage device of another type. The first memory 256 may include a RAM (Random Access Memory) configuring a work area of the first processor 255. The first memory 256 stores data to be processed by the first control section 250, a first control program to be executed by the first processor 255, and image data.

The first processor 255 executes the first control program, whereby the first control section 250 controls operation of the sections of the projector 200 and the projector 300.

For example, the first control section 250 generates the image light PL corresponding to an image supplied from the image supply device 600 via the image interface 241.

For example, the first control section 250 adjusts the image light PL based on an image supplied from the camera 100 via the image interface 241.

The first processor 255 may be configured by a single processor. A plurality of processors may function as the first processor 255. The first processor 255 executes the first control program to control the sections of the projector 200 and the projector 300. For example, the first processor 255 outputs an execution instruction for image processing corresponding to operation received by the first operation section 231 or the remote controller 5 and parameters used for the image processing to the first image processing section 245. The parameters include, for example, geometric correction parameters for correcting geometrical distortion of an image projected onto the screen SC. The first processor 255 controls the light-source driving section 221 to control lighting and extinction of the light source section 211 and adjusts the luminance of the light source section 211.

The first image processing section 245 and the frame memory 243 can be configured by, for example, an integrated circuit. The integrated circuit includes an LSI, an ASIC (Application Specific Integrated Circuit), and a PLD (Programmable Logic Device). The PLD includes, for example, an FPGA (Field-Programmable Gate Array). A part of the configuration of the integrated circuit may include an analog circuit. The first image processing section 245 and the frame memory 243 may be a combination of a processor and the integrated circuit. The combination of the processor and the integrated circuit is called micro controller unit (MCU), SoC (System-on-a-chip), system LSI, chipset, and the like.

The first image processing section 245 develops, on the frame memory 243, image data input from the image supply device 600 via the image interface 241. The frame memory 243 includes a plurality of banks. The banks have a storage capacity for enabling writing of image data for one frame. The frame memory 243 is configured by, for example, an SDRAM (Synchronous Dynamic Random Access Memory).

The first image processing section 245 performs, on the image data developed on the frame memory 243, image processing such as resolution conversion processing, resize processing, correction of distortion aberration, shape correction processing, digital zoom processing, and adjustment of a tint and luminance of an image.

The first image processing section 245 generates a vertical synchronization signal obtained by converting an input frame frequency of a vertical synchronization signal into a drawing frequency. The generated vertical synchronization signal is referred to as output synchronization signal. The first image processing section 245 outputs the generated output synchronization signal to the light-modulation-device driving section 222.

The first control section 250 includes a detecting section 251, a first processing section 252, and a second processing section 253. Specifically, the first processor 255 executes a first control program to thereby function as the detecting section 251, the first processing section 252, and the second processing section 253.

The detecting section 251 detects whether the camera 100 is attached to the projector main body 20. Specifically, the detecting section 251 detects whether the camera 100 is attached to the camera attachment section 260 of the projector main body 20.

The camera attachment section 260 is explained in detail below with reference to FIG. 4.

A switch or an electric contact is disposed in the camera attachment section 260. The detecting section 251 detects, based on a signal from the switch or the electric contact, whether the camera 100 is mounted on the projector main body 20.

When the detecting section 251 detects that the camera 100 is attached to the projector main body 20, the first processing section 252 executes first processing. Specifically, as the first processing, the first processing section 252 controls the operation of the camera 100. More specifically, the first processing section 252 causes the camera 100 to capture the projected image P displayed on the screen SC and generates a captured image. The first processing section 252 adjusts a position, a size, a color, brightness, and the like of the projected image P based on the captured image.

When the detecting section 251 detects that the camera 100 is not attached to the projector main body 20, the second processing section 253 executes second processing. Specifically, as the second processing, the second processing section 253 causes, based on operation on the camera 100, the projector 300 to project the image light PL showing a predetermined pattern image. As the second processing, the second processing section 253 causes the camera 100 to capture the pattern image displayed on the screen SC and generates a captured image. The second processing section 253 adjusts a position, a size, a color, brightness, and the like of the projected image P based on the captured image.

The pattern image is, for example, a solid pattern having a specific color. The specific color is, for example, white.

3. Configuration of the Camera Attachment Section

Figure 4:
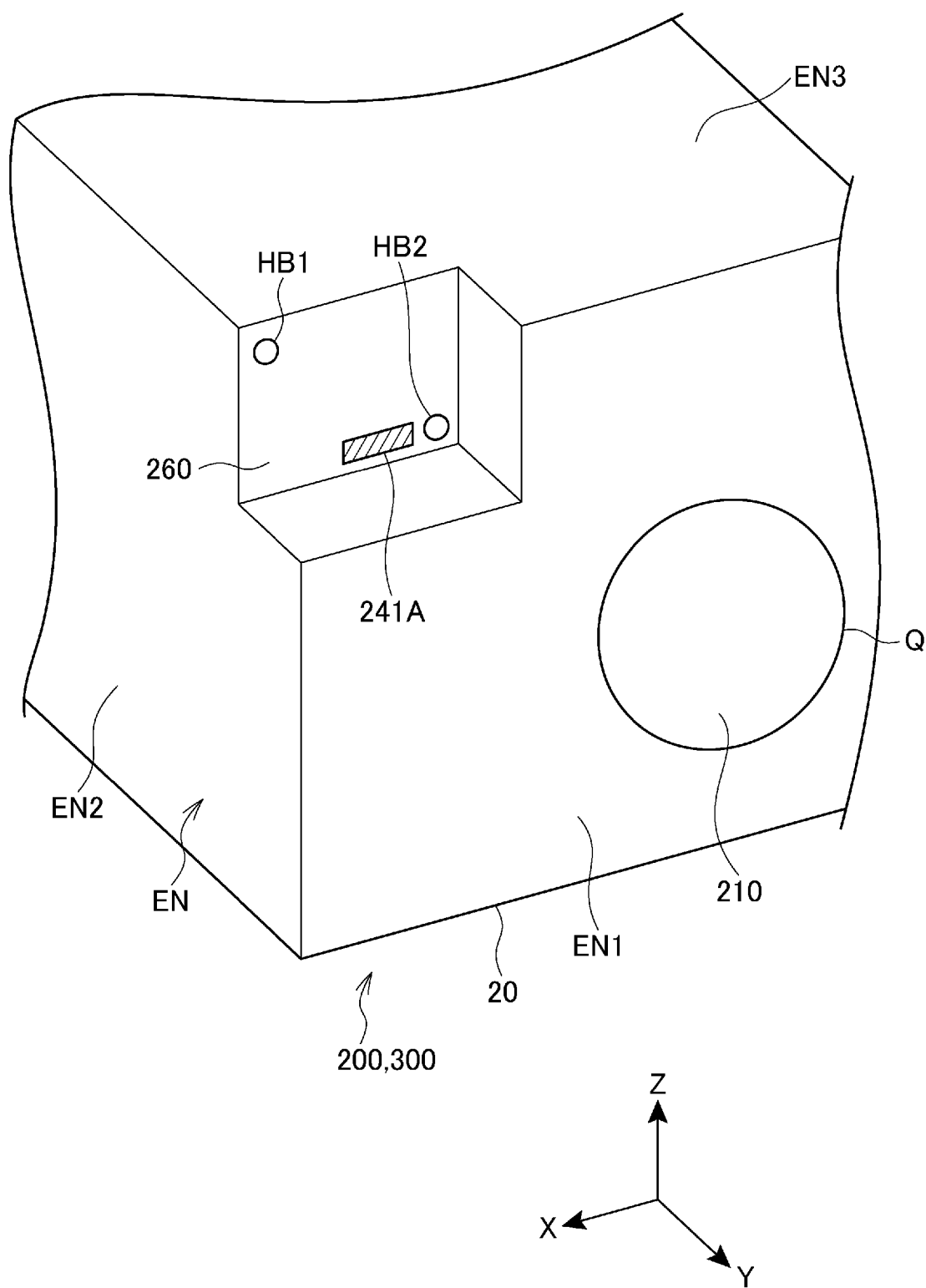
FIG. 4 is a diagram showing an example of the configuration of an camera attachment section of the projector.

FIG. 4 is a diagram showing an example of the configuration of the camera attachment section 260 of the projector main body 20.

The camera 100 is detachably attachable to the camera attachment section 260. The camera attachment section 260 is formed in the projector main body 20. The camera 100 attached to the camera attachment section 260 functions in the same manner as when the camera 100 is incorporated in the projector 200.

The projector main body 20 includes the enclosure EN. The enclosure EN houses the mounting section 210, the driving section 220, the first operation section 231, the remote-controller-light receiving section 233, the input interface 235, the first storing section 237, the image interface 241, the frame memory 243, the first image processing section 245, and the first control section 250. The enclosure EN is formed in a rectangular parallelepiped shape.

The enclosure EN includes a front surface enclosure EN1, a side surface enclosure EN2, and an upper surface enclosure EN3. The opening Q of the mounting section 210 is formed in the front surface enclosure EN1. The opening Q causes the image light PL from the optical unit 213 to pass. In the first state shown in FIG. 1, the projection optical device 400 is inserted into the opening Q. In the second state shown in FIG. 2, the projection optical device 410 is inserted into the opening Q.

The camera attachment section 260 is disposed at a corner portion of the enclosure EN. Corner portions of the enclosure EN are located at the upper left corner of the front surface enclosure EN1, the upper front corner of the side surface enclosure EN2, and the left front corner of the upper surface enclosure EN3.

The camera attachment section 260 forms a rectangular parallelepiped recess at the corner portion of the enclosure EN. The camera attachment section 260 includes a first connector 241A, a first screw hole HB1, and a second screw hole HB2.

The first connector 241A configures a part of the image interface 241 shown in FIG. 3. That is, the first connector 241A is communicably coupled to the first control section 250 via an interface circuit.

When the camera 100 is attached to the camera attachment section 260, a third connector 161 of the camera 100 is coupled to the first connector 241A. The third connector 161 is explained below with reference to FIGS. 5 and 6.

In this embodiment, the first connector 241A and the third connector 161 are communicably coupled according to the USB standard. In other words, the first connector 241A and the third connector 161 are connectors of the USB standard.

When the camera 100 is attached to the camera attachment section 260, a first bolt BL1 is screwed in the first screw hole HB1. The first bolt BL1 is explained in detail below with reference to FIG. 7.

When the camera 100 is attached to the camera attachment section 260, a second bolt BL2 is screwed in the second screw hole HB2. The second bolt BL2 is explained in detail below with reference to FIG. 7.

As shown in FIGS. 1 and 2, in the enclosure EN, the second connector 241B is disposed on a surface on the opposite side of the surface on which the camera attachment section 260 is disposed. The second connector 241B configures a part of the image interface 241 shown in FIG. 3. That is, the second connector 241B is communicably coupled to the first control section 250 via an interface circuit.

When the camera 100 is detached from the projector main body 20, the camera 100 is coupled to the second connector 241B via a USB cable.

In this embodiment, the second connector 241B and the camera 100 communicate according to the USB standard. In other words, the second connector 241B is a connector of the USB standard.

4. Configuration of the Camera

Figure 5:
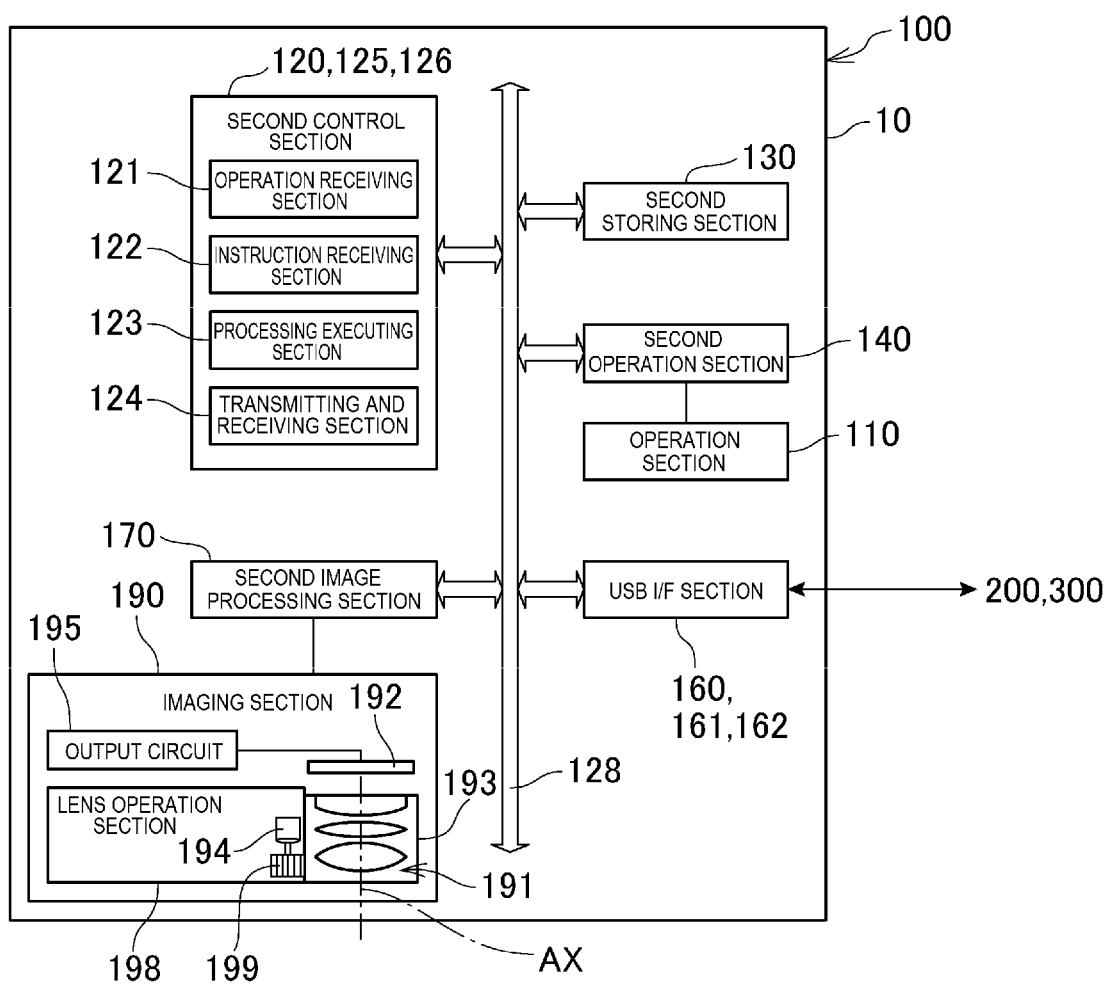
FIG. 5 is a diagram showing an example of a functional configuration of a camera.

FIG. 5 is a diagram showing an example of the configuration of the camera 100.

The camera 100 includes a second control section 120, a second storing section 130, a second operation section 140, a USB interface (USB I/F) section 160, a second image processing section 170, and an imaging section 190. A second internal bus 128 communicably couples the second control section 120 and the sections of the camera 100. The sections of the camera 100 include the second storing section 130, the second operation section 140, the USB interface section 160, and the second image processing section 170.

The second control section 120 includes a second processor 125 and a second memory 126 and controls the sections of the camera 100.

The second memory 126 is a storage device that stores, in a nonvolatile manner, programs to be executed by the second processor 125 and data. The second memory 126 is configured by a magnetic storage device, a semiconductor storage element such as a flash ROM, or a nonvolatile storage device of another type. The second memory 126 may include a RAM configuring a work area of the second processor 125. The second memory 126 stores data to be processed by the second control section 120 and a second control program to be executed by the second processor 125.

The second storing section 130 stores various programs to be executed by the second control section 120 and data to be processed by the second control section 120. For example, the second storing section 130 stores programs for controlling a USB module, a USB class driver, and the imaging section 190.

The second processor 125 may be configured by a single processor. A plurality of processors may function as the second processor 125. The second processor 125 executes the second control program and controls the sections of the camera 100. For example, the second processor 125 transmits image data indicating an image captured by the imaging section 190 to the projector 200 via the USB interface section 160.

The USB interface section 160 is an interface circuit that exchanges control data, image data, and the like with an external device according to the USB standard. In the embodiment of the present disclosure, the USB interface section 160 is coupled to the image interface 241 of the projector 200.

The USB interface section 160 includes the third connector 161 and a fourth connector 162. The third connector 161 and the fourth connector 162 are explained in detail below with reference to FIG. 7.

The imaging section 190 includes an imaging lens 191 and an imaging element 192 including a CCD (Charge Coupled Device) or a CMOS (Complementary MOS). The imaging lens 191 is configured by a lens or a lens group and configures an optical system that images an object. The imaging lens 191 is housed in a tubular lens barrel 193 and is movable along an optical axis AX.

The imaging section 190 includes a lens operation section 198 that moves the imaging lens 191 along the optical axis AX. The lens operation section 198 moves the lenses housed in the lens barrel 193 in the optical axis AX direction integrally with the lens barrel 193.

In this embodiment, the lens operation section 198 includes a motor 194 and a gear 199 that transmits a rotational force of the motor 194 to the lens barrel 193. The lens barrel 193 has, for example, a cylindrical shape. The lens barrel 193 is rotated in the circumferential direction around the optical axis AX, whereby the distance between the lens barrel 193 and the imaging element 192 changes. Accordingly, when the motor 194 is driven, the lens barrel 193 coupled via the gear 199 rotates and the distance between the imaging lens 191 and the imaging element 192 can be changed. A moving direction of the lens barrel 193 at the time when the motor 194 is rotated in the positive direction and a moving direction of the lens barrel 193 at the time when the motor 194 is rotated in the negative direction are opposite. That is, the moving direction of the lens barrel 193 is determined by a rotating direction of the motor 194.

The imaging section 190 includes an output circuit 195 that detects a signal from the imaging element 192, generates captured image data, and outputs the captured image data to the second image processing section 170.

The second image processing section 170 is coupled to the imaging section 190 and drives the imaging section 190 according to control data input from the second control section 120. The second image processing section 170 outputs a driving signal to the lens operation section 198 and operates the motor 194 to thereby move the lens barrel 193. The second image processing section 170 executes image processing for, for example, converting the captured image data output by the output circuit 195 into a form of image data processable by the second control section 120 and outputs data after the processing to the second control section 120.

The control data input to the second image processing section 170 from the second control section 120 can be, for example, control data for instructing execution of focus adjustment and control data for designating optical zoom magnification. When the control data for designating optical zoom magnification is input from the second control section 120, the second image processing section 170 outputs a driving signal to the lens operation section 198 to move the imaging lens 191 according to the designated optical zoom magnification. When the control data for instructing execution of focus adjustment is input from the second control section 120, the second image processing section 170 determines a focus state based on the captured image data output by the output circuit 195 and outputs a driving signal to the lens operation section 198.

The second image processing section 170 performs image processing such as edge detection and contrast measurement on the captured image data and determines the focus state. The second image processing section 170 moves the imaging lens 191 with the lens operation section 198 and specifies a preferred position of the imaging lens 191 based on a change in the focus state of the captured image data involved in the movement of the imaging lens 191.

The second operation section 140 detects operation on an operation section 110 and outputs data indicating operation content to the second control section 120. Specifically, the second operation section 140 detects user operation indicating that the image light PL showing the predetermined pattern image is projected and outputs data indicating operation content to the second control section 120.

In this embodiment, the second control section 120 transmits image data to the projector 200 via the USB interface section 160. However, the embodiments of the present disclosure are not limited to this. An interface for coupling to the projector 200 may be an analog interface such as a VGA, a D terminal, or an S terminal. The interface for coupling to the projector 200 may be a digital interface such as a DVI, an HDMI (registered trademark), a Display Port, or an HDBaseT (registered trademark). The interface for coupling to the projector 200 may be a communication interface such as an Ethernet (registered trademark) or IEEE1394.

The second control section 120 may transmit image data to the projector 200 via wireless communication such as Wi-Fi (registered trademark).

The second control section 120 of the camera 100 includes an operation receiving section 121, an instruction receiving section 122, a processing executing section 123, and a transmitting and receiving section 124. Specifically, the second processor 125 of the second control section 120 executes the second control program stored in the second memory 126 to thereby function as the operation receiving section 121, the instruction receiving section 122, the processing executing section 123, and the transmitting and receiving section 124.

The operation receiving section 121 receives the data indicating the operation content from the second operation section 140. The operation content includes depression of various keys such as an image projection key 112.

The image projection key 112 is explained in detail below with reference to FIG. 7.

The instruction receiving section 122 receives an instruction from the projector 300.

For example, the instruction receiving section 122 executes photographing of the projected image P displayed on the screen SC from the projector 300 and receives an image transmission instruction indicating that a photographed image is transmitted to the projector 300.

The processing executing section 123 executes processing corresponding to operation received by the operation receiving section 121.

For example, when the operation receiving section 121 receives depression of the image projection key 112, the processing executing section 123 outputs, to the projector 300, projection instruction information indicating that the image light PL showing the predetermined pattern image is projected.

The processing executing section 123 executes processing corresponding to an instruction from the projector 300 received by the instruction receiving section 122.

For example, when the instruction receiving section 122 receives the image transmission instruction, the processing executing section 123 executes photographing of the projected image P displayed on the screen SC from the projector 300 and transmits photographing image information to the projector 300.

The transmitting and receiving section 124 transmits and receives various kinds of information between the transmitting and receiving section 124 and the projector 300.

For example, the transmitting and receiving section 124 transmits the projection instruction information to the projector 300. For example, the transmitting and receiving section 124 transmits the photographed image information to the projector 300.

For example, the transmitting and receiving section 124 receives instruction information from the projector 300.

Figure 6:
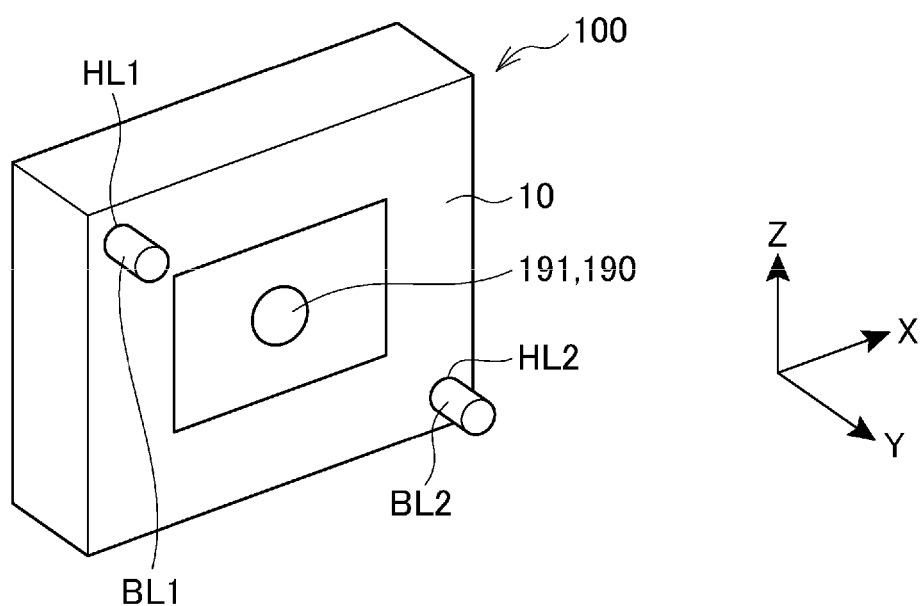
FIG. 6 is a perspective view showing an example of the configuration of the camera.
Figure 7:
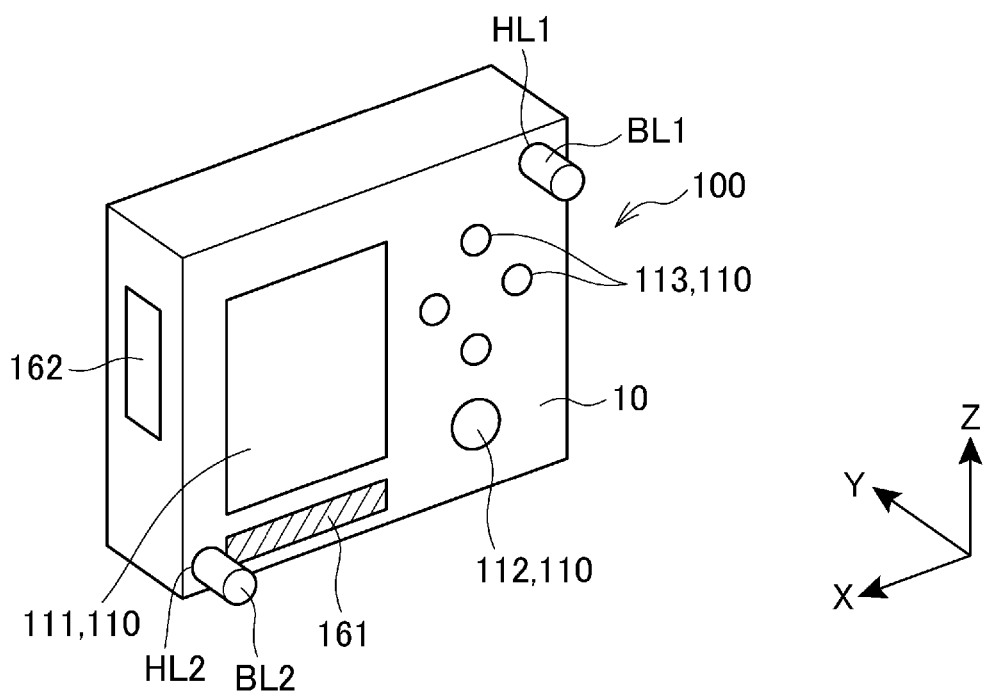
FIG. 7 is a perspective view showing an example of the configuration of the camera.

FIGS. 6 and 7 are perspective views showing an example of the configuration of the operation section 110 of the camera 100.

FIG. 6 is a perspective view including the front surface side of the camera 100.

The imaging lens 191 of the imaging section 190 is disposed in the center on the front surface side of the camera 100. A through-hole HL1 is disposed at a first corner portion of the camera 100. The first bolt BL1 is inserted through the through-hole HL1 from the front surface side of the camera 100. A through-hole HL2 is disposed at a second corner portion of the camera 100. The second bolt BL2 is inserted through the through-hole HL2 from the front surface side of the camera 100. The first corner portion and the second corner portion are opposed on the front surface of the camera 100.

The first bolt BL1 is screwed in the first screw hole HB1 of the projector main body 20 shown in FIG. 4 and the second bolt BL2 is screwed in the second screw hole HB2 of the projector main body 20 shown in FIG. 4, whereby the camera 100 is attached to the camera attachment section 260 shown in FIG. 4.

FIG. 7 is a perspective view including the rear surface side of the camera 100.

An LCD (Liquid Crystal Display) 111, the image projection key 112, various keys 113, and the third connector 161 are disposed on the rear surface side of the camera 100. The LCD 111, the image projection key 112, and the various keys 113 are included in the operation section 110 shown in FIG. 6.

Various images are displayed on the LCD 111 by the second control section 120. For example, when the camera 100 executes a photographing operation, a photographed image is displayed on the LCD 111.

When projection instruction information indicating that the image light PL showing the predetermined pattern image is projected is output to the projector 200, the image projection key 112 is depressed by the user.

The various keys 113 include, for example, a cross key. By operating the cross key to select one object out of a plurality of objects displayed on the LCD 111, the user can cause the camera 100 to execute processing corresponding to the one object.

When the camera 100 is attached to the camera attachment section 260, the third connector 161 is coupled to the first connector 241A of the projector 200 shown in FIG. 4.

The fourth connector 162 is disposed on the side surface of the camera 100. When the camera 100 is not attached to the camera attachment section 260, the fourth connector 162 is coupled to the second connector 241B of the projector 300 via a USB cable.

In this embodiment, the fourth connector 162 is disposed on the side surface of the camera 100. However, the embodiments of the present disclosure are not limited to this. The fourth connector 162 only has to be disposed in a position separated from the third connector 161. For example, the fourth connector 162 may be disposed on the lower surface of the camera 100. For example, the fourth connector 162 may be disposed on the upper surface of the camera 100.

5. Operations of the Camera and the Projector

Processing of the camera 100, the projector 200, and the projector 300 is explained with reference to FIGS. 8 and 9.

Figure 8:
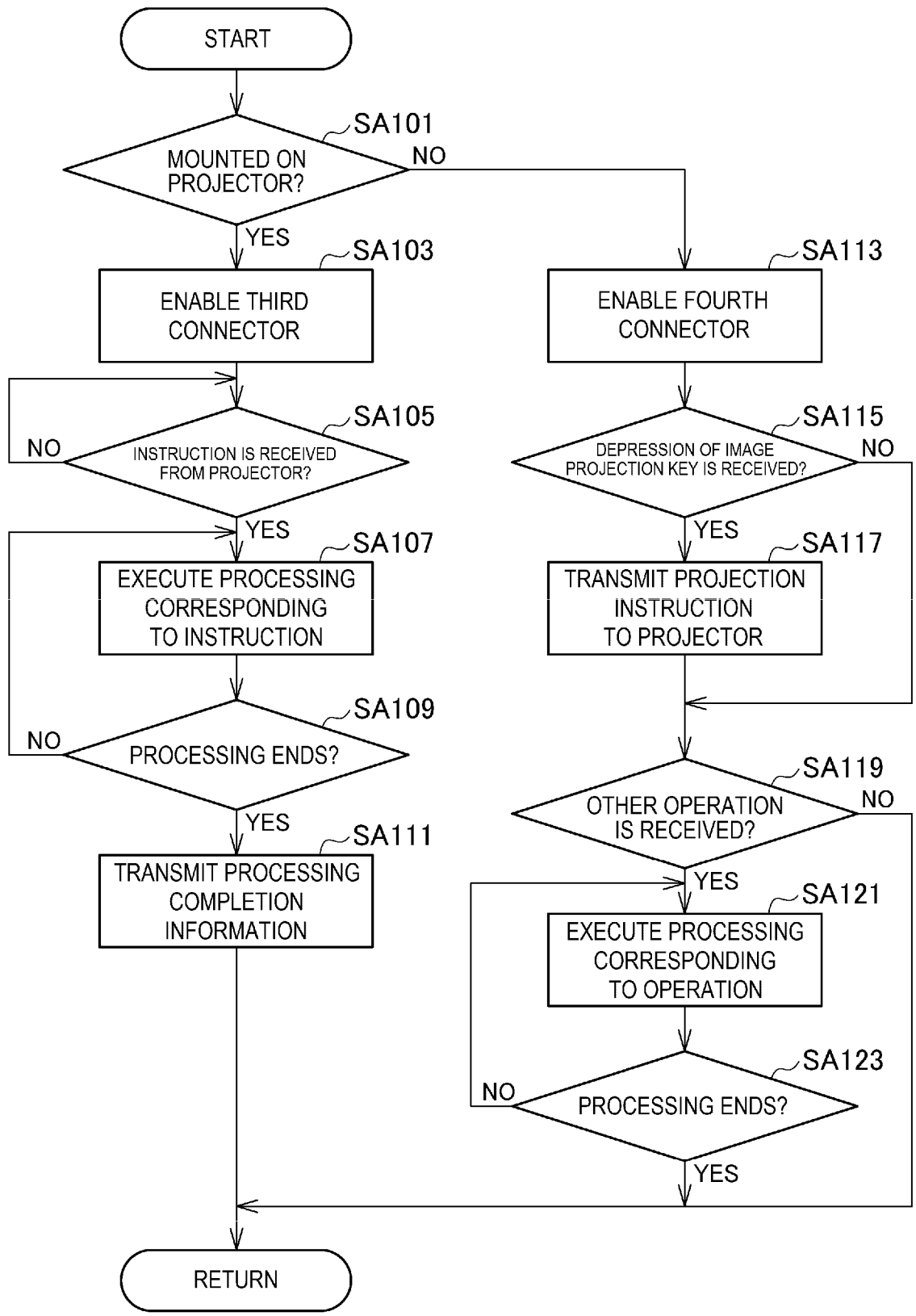
FIG. 8 is a flowchart showing an example of operation processing of the camera.

FIG. 8 is a flowchart showing an example of processing executed by the camera 100. In the projector 200, the camera 100 is attached to the projector main body 20. In the projector 300, the camera 100 is not attached to the projector main body 20.

First, in step SA101, the second control section 120 determines, based on whether electric power is supplied from the projector 200, whether the camera 100 is attached to the projector main body 20. Specifically, when electric power is supplied from the projector 200, the second control section 120 determines that the camera 100 is attached to the projector main body 20. When electric power is not supplied from the projector 200, the second control section 120 determines that the camera 100 is not attached to the projector main body 20.

When the second control section 120 determines that the camera 100 is not attached to the projector main body 20 (NO in step SA101), the processing proceeds to step SA113. When the second control section 120 determines that the camera 100 is attached to the projector main body 20 (YES in step SA101), the processing proceeds to step SA103.

In step SA103, the second control section 120 enables communication connection of the third connector 161. In other words, the second control section 120 sets the third connector 161 such that information from the third connector 161 is acquired. For example, the third connector 161 and the first connector 241A of the projector 200 are coupled, whereby electric power is supplied from the projector 200. The communication connection of the third connector 161 is enabled.

Subsequently, in step SA105, the instruction receiving section 122 determines whether an instruction from the projector 200 is received.

When the instruction receiving section 122 determines that an instruction from the projector 200 is not received (NO in step SA105), the processing enters a standby state. When the instruction receiving section 122 determines that an instruction from the projector 200 is received (YES in step SA105), the processing proceeds to step SA107.

In step SA107, the processing executing section 123 executes processing corresponding to the instruction from the projector 200.

Subsequently, in step SA109, the second control section 120 determines whether the processing of the processing executing section 123 ends.

When the second control section 120 determines that the processing of the processing executing section 123 does not end (NO in step SA109), the processing returns to step SA107. When the second control section 120 determines that the processing in the processing executing section 123 ends (YES in step SA109), the processing proceeds to step SA111.

In step SA111, the transmitting and receiving section 124 transmits, to the projector 200, processing completion information indicating that the processing corresponding to the instruction from the projector 200 is completed. Thereafter, the processing returns to step SA101.

When the second control section 120 determines that the camera 100 is not attached to the projector main body 20 (NO in step SA101), in step SA113, the second control section 120 enables communication connection of the fourth connector 162. In other words, the second control section 120 sets the fourth connector 162 such that information from the fourth connector 162 of the camera 100 is acquired. For example, the fourth connector 162 and the second connector 241B of the projector 300 are coupled via a USB cable, whereby electric power is supplied and the communication connection of the fourth connector 162 is enabled.

Subsequently, in step SA115, the operation receiving section 121 determines whether depression of the image projection key 112 is received.

When the operation receiving section 121 determines that depression of the image projection key 112 is not received (NO in step SA115), the processing proceeds to step SA119. When the operation receiving section 121 determines that depression of the image projection key 112 is received (YES in step SA115), the processing proceeds to step SA117.

In step SA117, the processing executing section 123 outputs, to the projector 300, projection instruction information indicating that the image light PL showing the predetermined pattern image is projected.

When the operation receiving section 121 determines that depression of the image projection key 112 is not received (NO in step SA115), in step SA119, the operation receiving section 121 determines whether other operation, that is, operation excluding depression of the image projection key 112 is received.

When the operation receiving section 121 determines that operation excluding depression of the image projection key 112 is not received (NO in step SA119), the processing returns to step SA101. When the operation receiving section 121 determines that operation excluding depression of the image projection key 112 is received (YES in step SA119), the processing proceeds to step SA121.

In step SA121, the processing executing section 123 executes processing corresponding to the operation received by the operation receiving section 121.

Subsequently, in step SA123, the second control section 120 determines whether the processing of the processing executing section 123 ends.

When the second control section 120 determines that the processing of the processing executing section 123 does not end (NO in step SA123), the processing returns to step SA121. When the second control section 120 determines that the processing of the processing executing section 123 ends (YES in step SA123), the processing returns to step SA101.

As explained with reference to FIG. 8, when the camera 100 is attached to the projector main body 20, the operation of the camera 100 can be controlled based on an instruction from the projector 200.

When the camera 100 is not attached to the projector main body 20, the user can cause the projector 300 to project the image light PL showing the predetermined pattern image by depressing the image projection key 112. Therefore, the user can easily dispose the camera 100 in a proper position.

Figure 9:
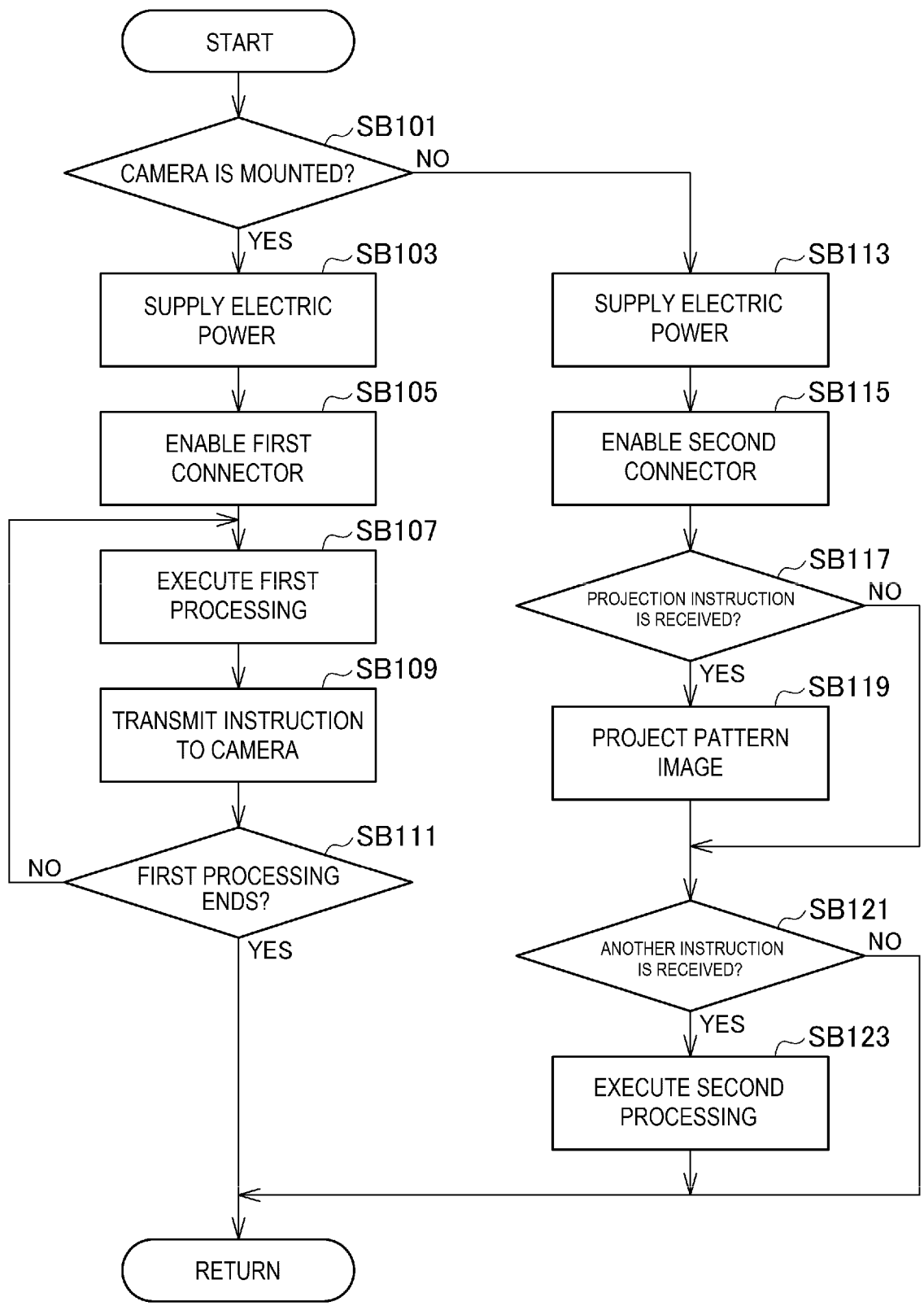
FIG. 9 is a flowchart showing an example of operation processing of the projector.

FIG. 9 is a flowchart showing an example of processing of the projector 200 and the projector 300.

As shown in FIG. 9, in step SB101, the detecting section 251 determines whether the camera 100 is attached to the projector main body 20.

When the detecting section 251 determines that the camera 100 is not attached to the projector main body 20 (NO in step SB101), the processing proceeds to step SB113. When the detecting section 251 determines that the camera 100 is attached to the projector main body 20 (YES in step SB101), the processing proceeds to step SB103.

In step SB103, the first control section 250 supplies electric power from the projector 200 to the camera 100. For example, the projector 200 supplies electric power to the camera 100 when the first connector 241A and the third connector 161 of the camera 100 are coupled.

In step SB105, for example, the first control section 250 enables communication connection of the first connector 241A. In other words, the first control section 250 sets the first connector 241A such that information from the first connector 241A is acquired.

Subsequently, in step SB107, the first processing section 252 executes the first processing. For example, the first processing section 252 causes the projector 200 to project the image light PL showing the predetermined pattern image.

Subsequently, in step SB109, as the first processing, the first processing section 252 transmits instruction information to the camera 100. For example, the first processing section 252 captures a pattern image displayed on the screen SC and transmits, to the camera 100, instruction information indicating that a photographed image is transmitted to the projector 200. As the first processing, for example, the projector 200 adjusts a color of the projected image P based on the photographed image.

Subsequently, in step SB111, the first control section 250 determines whether the first processing ends.

When the first control section 250 determines that the first processing does not end (NO in step SB111), the processing returns to step SB107. When the first control section 250 determines that the first processing ends (YES in step SB111), the processing returns to step SB101.

When the detecting section 251 determines that the camera 100 is not attached to the projector main body 20 (NO in step SB101), in step SB113, the first control section 250 supplies electric power from the projector 300 to the camera 100. For example, the projector 300 supplies electric power to the camera 100 through coupling of the second connector 241B of the projector 300 and the fourth connector 162 of the camera 100 via a cable.

In step SB115, for example, the first control section 250 enables communication connection of the second connector 241B. In other words, the first control section 250 sets the second connector 241B such that information from the second connector 241B is acquired.

Subsequently, in step SB117, the first control section 250 determines whether projection instruction information is received from the camera 100.

When the first control section 250 determines that projection instruction information is not received (NO in step SB117), the processing proceeds to step SB121. When the first control section 250 determines that projection instruction information is received (YES in step SB117), the processing proceeds to step SB119.

In step SB119, as the second processing, the second processing section 253 causes the projector 300 to project the image light PL showing the predetermined pattern image. Thereafter, the processing proceeds to step SB121.

When the first control section 250 determines that projection instruction information is not received (NO in step SB117), in step SB121, as the second processing, the first control section 250 determines whether another instruction, that is an instruction excluding a projection instruction is received. The other instruction indicates, for example, an instruction for causing the camera 100 to capture a pattern image displayed on the screen SC and generate a captured image, acquiring the captured image, and adjusting a color of the projected image P based on the captured image.

When the first control section 250 determines that another instruction is not received (NO in step SB121), the processing returns to step SB101. When the first control section 250 determines that another instruction is received (YES in step SB121), the processing proceeds to step SB123.

Subsequently, in step SB123, as the second processing, the first control section 250 executes processing corresponding to the other instruction. Thereafter, the processing returns to step SB101.

As explained with reference to FIG. 9, when the camera 100 is attached to the projector main body 20, the projector 200 can cause the camera 100 to capture a pattern image displayed on the screen SC and can adjust the projected image P based on a captured image.

When the camera 100 is not attached to the projector main body 20, the projector 300 can project, based on projection instruction information from the camera 100, the image light PL showing a pattern image, can cause the camera 100 to capture the pattern image displayed on the screen SC, and can adjust the projected image P based on a captured image.

As explained above with reference to FIGS. 1 to 9, a control method for the projector 200 according to this embodiment is a control method for the projector 200 on which the camera 100 is detachably mountable. When the camera 100 is mounted on the projector main body 20, the first processing is executed. When the camera 100 is detached from the projector main body 20, communication connection to the camera 100 is enabled. The second processing different from the first processing is executed.

That is, the first control section 250 is configured to be capable of communicating with the camera 100 when the camera 100 is detached from the projector main body 20. Accordingly, a captured image captured by the camera 100 can be acquired. When the camera 100 is mounted on the projector main body 20, the first processing is executed. When the camera 100 is detached from the projector main body 20, communication connection to the camera 100 is enabled and the second processing different from the first processing is executed. Therefore, even when the camera 100 is detached from the projector main body 20, it is possible to execute adjustment of a projected image using the captured image.

When the camera 100 is mounted on the projector main body 20, as the first processing, the operation of the camera 100 is controlled.

Therefore, since the first control section 250 controls the operation of the camera 100, the captured image captured by the camera 100 can be easily acquired. Therefore, adjustment of the projected image can be executed using the captured image.

The projector main body 20 includes the first connector 241A and the second connector 241B different from the first connector 241A. When the camera 100 is mounted on the projector main body 20, the first connector 241A coupled to the camera 100 is enabled. When the camera 100 is detached from the projector main body 20, the second connector 241B coupled to the camera 100 via the cable is enabled.

That is, when the camera 100 is mounted on the projector main body 20, the first connector 241A coupled to the camera 100 is enabled. When the camera 100 is detached from the projector main body 20, the second connector 241B coupled to the camera 100 via the cable is enabled. Accordingly, the projector main body 20 is coupled to the camera 100 by connectors different from each other when the camera 100 is mounted on the projector main body 20 and when the camera 100 is detached from the projector main body 20. Therefore, each of the projector 200 and the projector 300 can easily identify information transmitted and received to and from the camera 100 by the projector 200 when the camera 100 is mounted on the projector main body 20 and information transmitted and received to and from the camera 100 by the projector 300 when the camera 100 is detached from the projector main body 20. As a result, processing of the first control section 250 of each of the projector 200 and the projector 300 can be simplified.

When the camera 100 is detached from the projector main body 20, the second processing is executed based on operation on the camera 100.

Accordingly, the user can instruct processing of the projector 300 by operating the camera 100. Therefore, convenience of the user can be improved.

When the camera 100 is detached from the projector main body 20, as the second processing, the projector 300 projects the image light PL showing the predetermined pattern image in the first direction D1 based on operation on the camera 100.

Therefore, by operating the camera 100, the user can cause the projector 300 to project the image light PL showing the predetermined pattern image. Therefore, convenience for the user can be improved. For example, as shown in FIG. 2, when the camera 100 is supported by a tripod TP, by operating the camera 100, the user can easily adjust an imaging region of the camera 100 by causing the projector 300 to project the image light PL showing the predetermined pattern image and adjusting the position of the camera 100.

When the projection optical device 410 including a U-shaped optical path is mounted, the camera 100 is detached from the projector main body 20 and the image light PL is projected in the second direction D2, which is a direction different from the first direction D1, via the projection optical device 410. When the projection optical device 410 is detached, the camera 100 is mounted on the projector main body 20.

Therefore, when the projection optical device 410 is mounted on the mounting section 210, as shown in FIG. 2, the camera 100 is detached from the projector main body 20. Therefore, the imaging region of the camera 100 can be adjusted by adjusting the position of the camera 100. When the projection optical device 410 is detached from the mounting section 210, as shown in FIG. 1, the camera 100 is mounted on the projector main body 20. Therefore, the imaging region of the camera 100 can be properly set.

The projector 200 according to the embodiment of the present disclosure includes the projector main body 20 on which the camera 100 is detachably mountable, the interface configured to be capable of communicating with the camera 100 when the camera 100 is detached from the projector main body 20, the first processing section 252 that executes the first processing when the camera 100 is mounted on the projector main body 20, and the second processing section 253 that executes the second processing different from the first processing when the camera 100 is detached from the projector main body 20.

That is, the projector 300 is configured to be capable of communicating with the camera 100 when the camera 100 is detached from the projector main body 20. Accordingly, the projector 300 can acquire a captured image captured by the camera 100. When the camera 100 is mounted on the projector main body 20, the first processing section 252 executes the first processing. When the camera 100 is detached from the projector main body 20, the second processing section 253 executes the second processing different from the first processing. Therefore, even when the camera 100 is attached the projector main body 20, it is possible to execute adjustment of a projected image using the captured image.

6. Other Embodiments

The embodiment explained above is a preferred mode of implementation. However, the present disclosure is not limited to the embodiment explained above. Various modified implementations are possible within a range not departing from the gist.

In the above explanation in this embodiment, the "imaging device" is configured as the camera 100. However, the embodiments of the present disclosure are not limited to this. The "imaging device" only has to include the imaging section 190 and the second control section 120.

In this embodiment, the projection optical device 410 includes the U-shaped optical path. However, the embodiments of the present disclosure are not limited to this. The projection optical device 410 only has to project image light only in the second direction D2 different from the first direction D1. For example, the projection optical device 410 may include an L-shaped optical path.

In this embodiment, the second processing includes the processing for causing, based on operation on the image projection key 112 of the camera 100, the projector 300 to project the image light PL showing the predetermined pattern image. However, the embodiments of the present disclosure are not limited to this. The second processing only has to be different from the first processing. For example, the second processing only has to be processing based on operation on the camera 100. Specifically, the second processing may be processing for displaying, on the LCD 111, a menu screen for determining operation on the projector 300. In this case, by selecting an object displayed on a menu screen, the user can cause the projector 300 to execute various kinds of processing.

In this embodiment, the projector 200 includes the first connector 241A and the second connector 241B. However, the embodiments of the present disclosure are not limited to this. For example, the projector 200 may include the first connector 241A and may not include the second connector 241B. In this form, when the camera 100 is not mounted on the camera attachment section 260, the fourth connector 162 of the camera 100 is coupled to the first connector 241A of the projector 300 via a USB cable. In this form, the configuration of the projector 200 can be simplified.

In this embodiment, the camera attachment section 260 is formed in the projector main body 20. However, the embodiments of the present disclosure are not limited to this. For example, the camera attachment section 260 maybe disposed in a so-called adapter form to be detachably mountable on the projector main body 20. In this form, the configurations of the projector 200 and the projector 300 can be simplified.

The functional sections shown in each of FIGS. 3 and 6 show functional components. Specific implementation forms of the functional sections are not particularly limited. That is, hardware individually corresponding to the functional sections is not always necessary. It is naturally possible to adopt a configuration in which one processor executes a program to realize functions of a plurality of functional sections. Apart of the functions realized by software in the embodiment may be realized by hardware or a part of the functions realized by hardware in the embodiment may be realized by software. Besides, specific detailed configurations of the other sections of each of the projector 200, the projector 300 and the camera 100 can also be optionally changed in a range not departing from the gist.

Processing units of the flowchart in each of FIGS. 8 and 9 are divided according to main processing content in order to facilitate understanding of the processing of the camera 100 or the projector 200 and the projector 300. The division of the processing units is not limited by a method of the division and names of the processing units shown in the flowchart in each of the FIGS. 8 and 9. The processing units can also be divided into more processing units according to processing content or can also be divided such that one processing unit includes more processing. Processing order of the flowchart is not limited to an illustrated example.

The control method for the projector 200 and the projector 300 can be realized by causing the first processor 255 included in each of the projector 200 and the projector 300 to execute a first control program corresponding to the control method for the projector 200 and the projector 300. The first control program can also be recorded in a computer-readable recording medium. As the recording medium, a magnetic or optical recording medium or a semiconductor memory device can be used. Specifically, examples of the recording medium include portable or stationary recording media such as a flexible disk, a HDD, a CD-ROM (Compact Disk Read Only Memory), a DVD, a Blu-ray (registered trademark) Disc, a magneto-optical disk, a flash memory, and a card-type recording medium. The recording medium may be a nonvolatile storage device such as a RAM, a ROM, or a HDD, which is an internal storage device included in an image processing device. The control method for the projector 200 can also be realized by causing a server device or the like to store a second control program corresponding to the control method for the projector 200 and downloading the second control program from the server device to the projector 200.

What is claimed is:

1. A control method for a projector on which a camera is detachably mountable, the control method comprising:
   in response to determining that the camera is mounted on the projector,
      automatically enabling a first connector on the projector, the first connector enabling communication connection between the camera and the projector, and executing first processing; and
   in response to determining that the camera is detached from the projector,
      automatically enabling a second connector different from the first connector on the projector, the second connector enabling communication connection between the camera and the projector, and executing second processing different from the first processing.

2. The control method for a projector according to claim 1, wherein, in response to determining that the camera is mounted on the projector, as the first processing, operation of the camera is controlled.

3. The control method for a projector according to claim 1, wherein
in response to determining that the camera is mounted on the projector, the first connector coupled to the camera is enabled, and
in response to determining that the camera is detached from the projector, the second connector coupled to the camera via a cable is enabled.

4. The control method for a projector according to claim 1, wherein, in response to determining that the camera is detached from the projector, the second processing is executed based on operation on the camera.

5. The control method for a projector according to claim 4, wherein, in response to determining that the camera is detached from the projector, as the second processing, image light showing a predetermined pattern image is projected in a first direction based on the operation on the camera.

6. The control method for a projector according to claim 5, wherein
when a projection optical device having a U-shaped optical path is mounted, the camera is detached from the projector and the image light is projected in a second direction different from the first direction via the projection optical device, and
when the projection optical device is detached, the camera is mounted on the projector.

7. The control method for a projector according to claim 1, wherein
the first processing includes, in response to determining that the camera is mounted on the projector, the projector projects a pattern image without receiving projection instruction information from the camera, and
the second processing includes, in response to determining that the camera is detached from the projector, the projector projects the pattern image when projection instruction information is received from the camera.

8. A projector comprising:
a projector main body on which a camera is detachably mountable;
an interface circuit configured to be capable of communicating with the camera when the camera is detached from the projector main body; and
a processor configured to:
in response to determining that the camera is mounted on the projector main body,
automatically enable a first connector on the projector, the first connector enabling communication connection between the camera and the projector, and
execute first processing; and
in response to determining that the camera is detached from the projector main body,
automatically enable a second connector different from the first connector on the projector, the second connector enabling communication connection between the camera and the projector, and
execute second processing different from the first processing.

* * * * *